E. SHERWOOD.
CAR FENDER.
APPLICATION FILED APR. 12, 1909.
953,064.
Patented Mar. 29, 1910.
Fig. 1.
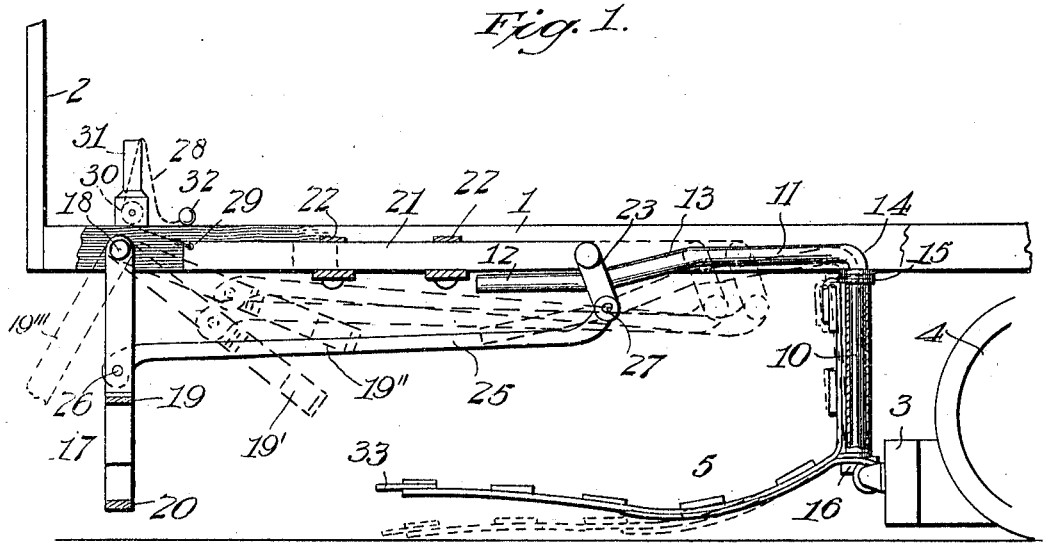
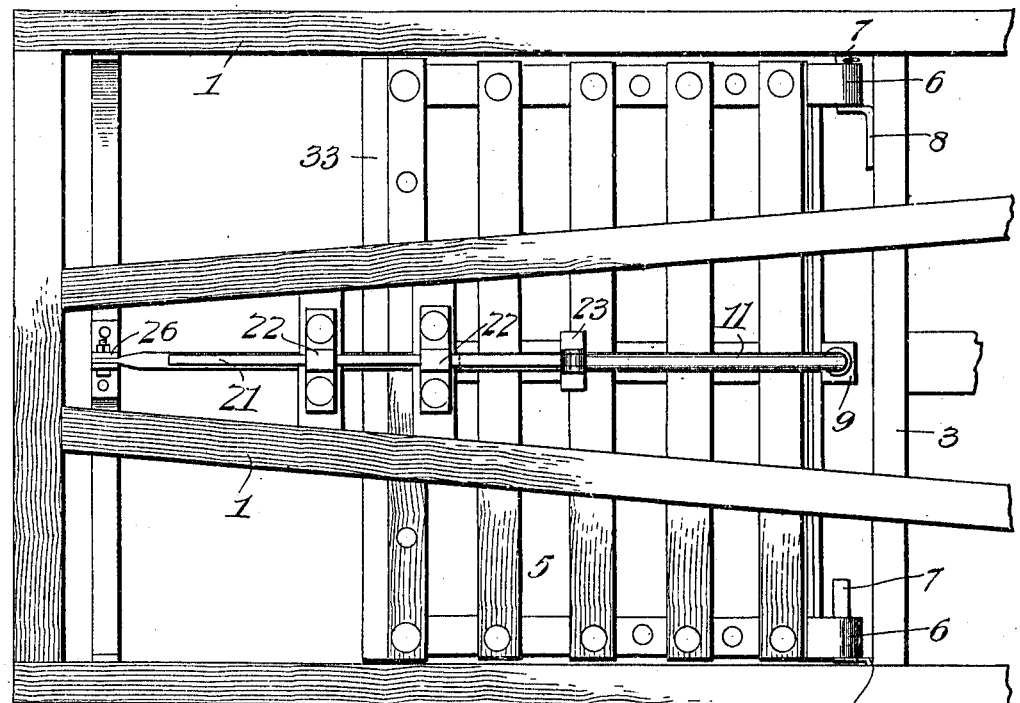
Fig. 2.
Fig. 3.
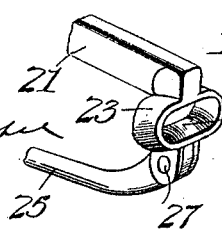
Witnesses
Inventor
Earl Sherwood
By
Attorney

UNITED STATES PATENT OFFICE.

EARL SHERWOOD, OF HONESDALE, PENNSYLVANIA.

CAR-FENDER.

953,064.  Specification of Letters Patent.  Patented Mar. 29, 1910.

Application filed April 12, 1909. Serial No. 489,443.

*To all whom it may concern:*

Be it known that I, EARL SHERWOOD, a citizen of the United States, residing at Honesdale, in the county of Wayne and State of Pennsylvania, have invented new and useful Improvements in Car-Fenders, of which the following is a specification.

This invention relates to car fenders and has for its object the production of a reliable, automatic fender embodying a scoop mounted for up and down movement on the car and combined with a trip adapted upon coming in contact with an object, to operate with a positive movement upon the scoop and depress the same to an operative position.

A further object of the invention is to so mount and combine and connect the scoop and trip that when the scoop is depressed by the action of the trip, said scoop is locked in its depressed position and held down with considerable pressure.

A further object of the invention is to provide means of a simple character whereby the scoop is locked in both its elevated and depressed positions and also adapted to swing with the truck so as to follow the curvature of the track.

A further object of the invention is to arrange the trip in such manner that it will be easily operated by children as well as adults and either by small or large objects; furthermore the trip is adapted to be folded upward out of the way so as to clear all kinds of obstructions such as deep snow and the like.

With the above and other objects in view, the nature of which will more fully appear as the description proceeds, the invention consists in the novel construction, combination and arrangement of parts as herein fully described, illustrated and claimed.

In the accompanying drawings:—Figure 1 is a side elevation, partly in section, showing a portion of a car platform and one of the trucks, with the improved car fender and its operating mechanism applied thereto. Fig. 2 is a plan view of the same. Fig. 3 is a detail perspective view of the runner and a portion of the slide and connecting rod.

Referring to the drawings, 1 designates a car platform, 2 the dash at one end thereof and 3 the forward portion of one of the truck frames, one of the wheels of which is indicated at 4.

The scoop indicated at 5 is substantially L-shaped and is mounted for up and down movement preferably on the truck frame 3 by providing the scoop at opposite sides with knuckles 6 which fit over pins 7 formed on brackets 8 secured to the truck frame 3 as shown in Figs. 1 and 2, said pins 7 being horizontally disposed so as to enable the projecting portion of the scoop 5 to be elevated and depressed as indicated by full and dotted lines in Fig. 1. This also causes the scoop as a whole to swing with the truck 3, causing said scoop to follow curves in the track, independently of the platform 1 beneath which the trucks swing in the usual manner. The scoop comprises an upright sleeve 9 in which is mounted the journal or vertical pivot portion 10 of a lever arm which is bent as shown in Fig. 1 to comprise two horizontal portions 11 and 12 and an intermediate inclined portion 13, said lever arm, as a whole extending forward toward the end of the platform.

In the preferred embodiment of the invention, in order to provide for a limited adjustment of the lever arm upward and downward to suit different cars, said lever arm is provided with a shoulder or fixed collar 14 beneath which one or more washers 15 are adapted to be placed, said washers encircling the journal or pivot 10 and being interposed between the shoulder 14 and the upper end of the sleeve 9, while the lower end of the pivot or journal 11 has a nut 16 or its equivalent placed thereon to hold the arm connected to the scoop.

Pivotally mounted on the platform 1 is a trip 17 consisting of an oblong rectangular frame which hangs in a pendent position beneath the platform and is secured pivotally thereto at 18 to swing on a horizontal axis as indicated by dotted lines in Fig. 1. In order to adapt said trip to be operated by objects both large and small the trip comprises upper and lower horizontal cross bars 19 and 20 thus insuring the operation of the trip by any object on the track in advance of the fender.

21 designates a slide in the form of a bar operating through guides 22 fastened to the platform frame as shown in Figs. 1 and 2, said slide having secured to its rear end an eye 23 which is shown in detail in Fig. 3 wherein it will be observed that said eye is oblong in shape and has its inner surface rounded as at 24 so as to slide readily on the lever arm above described and accommodate itself to the horizontal and inclined portions of said arm as it slides lengthwise of the arm. It will also be noted that the eye 23 is disposed in an inclined plane substantially at right angles to the plane of the inclined portion 13 of the lever arm so that said eye is adapted to readily slide along the inclined portion of the lever arm as well as the horizontal portions thereof. A connecting rod 25 is pivotally attached at its forward end at the point 26 to the trip 17 and is also pivotally connected at 27 to the eye 23 so that as the trip swings back and forth a corresponding movement is imparted to the slide 21.

28 designates a flexible scoop-setting connection which may consist of a chain having one end connected to the forward end of the slide 21 at the point 29, said connection extending around a guide pulley 30 and upward through a chain pipe 31 on the car platform and being provided at its free end with a stop 32 to prevent the chain or connection from passing entirely downward through such pipe.

In operation, when the trip 17 comes in contact with a person or object on the track, said trip is caused to swing rearwardly and operates through the connecting rod 25 to move the slide 21 rearward. This causes the eye or runner 23 to move backward along the lever arm from the lower horizontal portion 12 along the inclined portion 13 to the upper horizontal portion 11. This acts to depress the lever arm and correspondingly depress the scoop from the full line position of Fig. 1 to the dotted line position of the same figure and this depressing operation may be effected at any time whether the truck frame 3 is in line with the platform frame or at an angle thereto owing to the jointed connection between said lever arm and the scoop. It will be noted that the trip and its connections swing upward in close proximity to the truck frame so as to allow the body to pass on to the depressed scoop. In case of a heavy snow or other obstructions on the track, the trip 17 may be swung to the forward dotted line position shown in Fig. 1 to enable the same to clear the snow or other obstructions when this is desirable or necessary. The position of the stop 32 indicates when the scoop is depressed and the motorman may reset the fender scoop by pulling upward on the connection 28 until it assumes the position shown in Fig. 1.

It will be noted that by means of the construction described, the scoop is held locked both in its depressed position and in its elevated position and when held depressed, the pressure is sufficient to hold the forward edge of the scoop in firm sliding contact with the surface of the ground, thereby preventing any object, however small, from getting caught beneath the edge of the scoop. At its forward edge, the scoop is preferably provided with a rubber strip 33, which rides in contact with the ground and comes in contact with the person or body as the latter is taken up by the scoop.

When a child is struck by the trip, the latter swings back to the position 19' of Fig. 1, causing the eye or runner 23 to slide along the inclined portion 13 up to the horizontal portion 11 of the lever arm. When a larger object such as an adult is struck by the trip, the latter may swing up to the position 19'', forcing the runner or eye 13 backward along the horizontal portion 11. When a loaded car has a fender on the rear platform and an obstruction strikes its trip, the latter swings outward as at 19''' and the runner or eye 23 slides back on the horizontal portion 12 of the lever arm and prevents injury to the trip.

I claim:—

1. A car fender scoop mounted for up and down movement on a car and adapted to swing laterally beneath the car platform, a trip mounted for movement under the platform, and means embodying a lever arm carried by a vertical bearing provided on the scoop and a runner actuated by the trip and coöperating with said lever arm in such manner that the movement of the trip serves to depress the fender scoop.

2. A car fender scoop mounted for up and down movement on a car and adapted to swing laterally beneath the car, a trip mounted for movement under the car platform, a lever arm carried by a vertical bearing provided on the scoop and a trip operated element coöperating with said lever arm in such manner that the movement of the trip serves to depress the fender scoop.

3. A car fender scoop mounted for up and down movement on a car and adapted to swing laterally beneath the car platform, a trip mounted for movement under the platform, a lever arm having a jointed connection with the scoop, and a runner actuated by said lever arm and connected with the trip in such manner that the movement of the trip and runner serves to depress the fender scoop.

4. A car fender scoop mounted for up and down movement on a car and adapted to swing laterally beneath the car platform, a trip mounted for movement under the platform, a lever arm carried by a vertical bearing provided on the scoop, and a runner connected with the trip and coöperating with said arm in such manner that the movement of the trip and runner serves to depress the fender scoop.

5. A car fender scoop mounted for up and down movement on a car and adapted to swing therewith beneath the car platform, a trip mounted for movement on the platform, a lever arm connected with the scoop and provided with an inclined portion and a horizontal portion, and a runner connected with the trip and coöperating with said arm in such manner that the movement of the trip serves to depress the fender scoop and lock the same depressed.

6. A car fender scoop mounted for up and down movement on a car and adapted to swing therewith beneath the car platform, a trip mounted for movement on the platform, a lever on the scoop provided with an inclined portion and two horizontal portions, and a runner connected with the trip and coöperating with said arm in such manner that the movement of the trip serves to elevate and depress the scoop and lock the same in a depressed or elevated position.

In testimony whereof I affix my signature in presence of two witnesses.

EARL SHERWOOD.

Witnesses:
T. LLOYD MOCKABEE,
ROBERT N. JONES.